(12) United States Patent
Norville et al.

(10) Patent No.: US 11,592,304 B2
(45) Date of Patent: Feb. 28, 2023

(54) SURFACE DETECTION FOR MICROMOBILITY VEHICLES

(71) Applicant: Bose Corporation, Framingham, MA (US)

(72) Inventors: Pelham Norville, Wayland, MA (US); Robert Timothy Bettridge, Toronto (CA); Ilissa Brooke Bruser, Framingham, MA (US); Naganagouda Patil, Westborough, MA (US); Erich Andrew Wiernasz, Somerville, MA (US); Thomas David Chambers, Bellingham, MA (US); Ramiz Kamal Khan, Toronto (CA); Tian Hung Lim, Newmarket (CA); Denis Mathieu Lirette, Toronto (CA); Chloe Elizabeth Blanchard, Toronto (CA); Kama Gabriela Kaczmarczyk, Toronto (CA); Mikkel Lunding, Toronto (CA)

(73) Assignee: Bose Corporation, Framingham, MA (US)

( * ) Notice: Subject to any disclaimer, the term of this patent is extended or adjusted under 35 U.S.C. 154(b) by 554 days.

(21) Appl. No.: 16/779,844

(22) Filed: Feb. 3, 2020

(65) Prior Publication Data

US 2021/0239477 A1  Aug. 5, 2021

(51) Int. Cl.
*G01C 21/34* (2006.01)
*G07C 5/08* (2006.01)
(Continued)

(52) U.S. Cl.
CPC .......... *G01C 21/3461* (2013.01); *B60L 15/00* (2013.01); *G01C 21/3629* (2013.01); *G01C 21/3652* (2013.01); *G07C 5/085* (2013.01); *G08G 1/052* (2013.01); *G08G 1/09626* (2013.01); *A63C 17/12* (2013.01); *B60L 2200/12* (2013.01); *B60L 2200/14* (2013.01);
(Continued)

(58) Field of Classification Search
None
See application file for complete search history.

(56) References Cited

U.S. PATENT DOCUMENTS 9,489,635 B1 * 11/2016 Zhu ...................... G06V 10/987
2015/0371095 A1 * 12/2015 Hartmann ................ G06T 3/40
348/148
(Continued)

*Primary Examiner* — Hunter B Lonsberry
*Assistant Examiner* — Daniel L Greene
(74) *Attorney, Agent, or Firm* — Hoffman Warnick LLC

(57) ABSTRACT

Various implementations include approaches for training a surface detection classifier and detecting characteristics of a surface, along with related micromobility vehicles. Certain implementations include a method including: comparing: i) detected movement of a micromobility (MM) vehicle or a device located with a user at the MM vehicle while operating the MM vehicle, with ii) a surface detection classifier for the MM vehicle; and in response to detecting that the MM vehicle is traveling on a restricted surface type for a threshold period, performing at least one of: a) notifying an operator of the MM vehicle about the travel on the restricted surface type, b) outputting a warning at an interface connected with the MM vehicle or the device, c) limiting a speed of the MM vehicle, or d) disabling operation of the MM vehicle.

20 Claims, 6 Drawing Sheets

Sidewalk

Walkway

(51) Int. Cl.
  *G08G 1/0962* (2006.01)
  *G01C 21/36* (2006.01)
  *B60L 15/00* (2006.01)
  *G08G 1/052* (2006.01)
  *A63C 17/12* (2006.01)
  *B62J 45/40* (2020.01)
  *B62J 50/21* (2020.01)
  *B62K 1/00* (2006.01)
  *B62K 3/00* (2006.01)
  *B62K 5/02* (2013.01)

(52) U.S. Cl.
  CPC ............ *B60L 2200/24* (2013.01); *B62J 45/40* (2020.02); *B62J 50/21* (2020.02); *B62K 1/00* (2013.01); *B62K 3/00* (2013.01); *B62K 5/02* (2013.01); *B62K 2202/00* (2013.01)

(56) References Cited

U.S. PATENT DOCUMENTS

| | | | |
|---|---|---|---|
| 2016/0214715 A1* | 7/2016 | Meffert | G01W 1/00 |
| 2016/0221581 A1* | 8/2016 | Talwar | B60W 30/00 |
| 2020/0124430 A1* | 4/2020 | Bradlow | G06Q 30/0207 |
| 2021/0034156 A1* | 2/2021 | Drayna | G06F 3/017 |
| 2021/0171144 A1* | 6/2021 | Champoux | B62J 3/14 |
| 2021/0191424 A1* | 6/2021 | Drayna | G08G 1/096775 |

* cited by examiner

SURFACE DETECTION FOR MICROMOBILITY VEHICLES

TECHNICAL FIELD

This disclosure generally relates to micromobility (MM) vehicles. More particularly, the disclosure relates to approaches for controlling MM vehicle operation.

BACKGROUND

Micromobility (MM) vehicles such as scooters, tricycles, bicycles, and other multi-person and personal transport vehicles are becoming increasingly popular. For example, these MM vehicles are often utilized in urban environments where users desire efficient transportation over relatively short distances. However, some MM vehicle users have been known to direct these vehicles over unintended surfaces and routes, at times interfering with pedestrians and other travelers. These usage patterns have reduced the appeal of MM vehicles in many areas.

SUMMARY

All examples and features mentioned below can be combined in any technically possible way.

Various implementations include approaches for training a surface detection classifier for a micromobility vehicle. Additional implementations include approaches for controlling a micromobility vehicle based on surface detection. Further implementations include micromobility vehicles with surface detection-based controls.

In some particular aspects, a computer-implemented method includes: comparing: i) detected movement of a micromobility (MM) vehicle or a device located with a user at the MM vehicle while operating the MM vehicle, with ii) a surface detection classifier for the MM vehicle; and in response to detecting that the MM vehicle is traveling on a restricted surface type for a threshold period, performing at least one of: a) notifying the user of the MM vehicle about the travel on the restricted surface type, b) outputting a warning at an interface connected with the MM vehicle or the device, c) limiting a speed of the MM vehicle, or d) disabling operation of the MM vehicle.

In additional particular aspects, a micromobility vehicle includes: a body at least partially containing: a platform for supporting a user, at least one wheel, and a motor coupled with the at least one wheel; a sensor for detecting movement of the MM vehicle or the user; and a controller connected with the sensor and configured to regulate the motor, where the controller is programmed to: compare: i) detected movement of a micromobility (MM) vehicle or a device located with the user at the MM vehicle while operating the MM vehicle, with ii) a surface detection classifier for the MM vehicle; and in response to detecting that the MM vehicle is traveling on a restricted surface type for a threshold period, performing at least one of: a) notify an operator of the MM vehicle about the travel on the restricted surface type, b) output a warning at an interface connected with the MM vehicle or the device, c) limit a speed of the MM vehicle, or d) disable operation of the MM vehicle.

In other particular aspects, a method of training a surface detection classifier for a micromobility (MM) vehicle includes: obtaining sensor data from a set of MM vehicles about travel along a route; obtaining tagged image data comprising tagged images of the set of MM vehicles traveling along the route; and assigning a sensor threshold indicating that the MM vehicle is traveling on a surface type based on correlations between the sensor data about travel along the route and the tagged images of the MM vehicles.

Implementations may include one of the following features, or any combination thereof.

In some cases, the surface type includes a sidewalk surface or another surface over which MM vehicle travel is restricted by a governing body.

In particular aspects, the correlations are determined by aligning respective timestamps for the sensor data about travel along the route with the tagged image data.

In certain cases, the sensor threshold includes a range of sensor values or a threshold pattern of sensor values indicative of travel on the surface type.

In particular aspects, the set of MM vehicles includes a plurality of MM vehicles including at least one of: a scooter, a tricycle, a bicycle, a unicycle, a skateboard, a multi-person transport vehicle or a personal transport vehicle.

In some implementations, the sensor data is detected by a sensor on each MM vehicle that is configured to detect vibration of the MM vehicle.

In certain aspects, the method includes: obtaining additional sensor data from a sensor at each MM vehicle or a sensor on a user's device, where the additional sensor data includes at least one of: camera data, inertial measurement unit (IMU) data, voice activity data, acoustic signal data, environmental condition data, MM vehicle condition data, vehicle to everything (V2X) data from another vehicle, or location data about the MM vehicle or the device; and adjusting the sensor threshold indicating that the MM vehicle is traveling on the surface type based on the additional sensor data.

In particular implementations, the method further includes: identifying the surface type at a set of locations along the route based on the tagged image data and the sensor data; identifying surface anomalies along the route based on the sensor data; updating map data to reflect the identified surface type at the set of locations and the surface anomalies along the route; and updating the surface detection classifier to assign distinct sensor thresholds for indicating that the MM vehicle is traveling on the surface type to distinct geographic locations based on the updated map data.

In particular cases, the surface detection classifier includes a neural network that is configured, after training, to adjust the sensor threshold based on additional correlations between: additional sensor data from a set of MM vehicles about travel along an additional route, and tagged images of the MM vehicles traveling along the additional route.

In some aspects, the method further includes logging sensor data and location data about the MM vehicle or the device in response to detecting that the MM vehicle is traveling on the restricted surface type.

In certain implementations, the method further includes updating the detection classifier in response to detecting that the MM vehicle is traveling on a restricted surface type or in response to detecting that the MM vehicle is traveling on a permitted surface type.

In particular cases, the surface detection classifier includes correlations between: sensor data about movement of the MM vehicle or the device, and travel surface types.

In some aspects, the threshold period is based on a confidence level of detecting that the MM vehicle is traveling on a restricted surface type.

In certain implementations, the method further includes: prompting the user for feedback about the surface type over which the MM vehicle is travelling; and updating the surface detection classifier based upon received feedback from the user.

In some aspects, the sensor includes at least one of: a micro-electro-mechanical system (MEMS) sensor configured to detect vibration of the MM vehicle, or an inertial measurement unit (IMU) configured to detect vibration of the device.

In particular cases, the MM vehicle further includes a location sensor coupled with the controller for detecting a geographic location of the MM vehicle, where the controller is further configured to log sensor data and location data about the MM vehicle or the device in response to detecting that the MM vehicle is traveling on the prohibited surface type.

In certain implementations, the controller is further configured to update the detection classifier based upon detecting that the MM vehicle is traveling on a restricted surface type or based upon detecting that the MM vehicle is traveling on a permitted surface type, where the surface detection classifier includes correlations between: sensor data about movement of the MM vehicle or the device, and travel surface types, and where the threshold period is based on a confidence level of detecting that the MM vehicle is traveling on a restricted surface type.

In some aspects, the controller is further configured to: prompt the user for feedback about the surface type over which the MM vehicle is travelling; and update the surface detection classifier based upon received feedback from the user.

In particular implementations, the surface detection classifier includes at least two distinct models including: a) a model of a human user damping system and reaction of the human user damping system to vibration, and b) a model of the MM vehicle damping system and reaction of the MM vehicle damping system to vibration, where the surface detection classifier differentiates between reaction of the human user damping system and reaction of the MM vehicle damping system to vibration.

In certain cases, the device includes at least one of a smart device or a wearable audio device.

In some aspects, the method further includes providing navigation instructions to the user based on a travel route of the MM vehicle, the surface detection classifier for the MM vehicle, and a known surface type along the travel route.

In particular implementations, the navigation instructions prompt the user to limit travel of the MM vehicle over the restricted surface type, where the navigation instructions are provided as an indicator including at least one of an affirmation indicator or an action indicator, and where the indicator includes audio instructions on the device or a tactile indicator at the device or the MM vehicle.

In certain aspects, the method further includes providing navigation instructions to the user based on a detected ambient environmental condition in an environment proximate a travel route of the MM vehicle, and the ambient environmental condition is detected by sensors on a plurality of distinct MM vehicles in the environment that are distinct from the MM vehicle.

Two or more features described in this disclosure, including those described in this summary section, may be combined to form implementations not specifically described herein.

The details of one or more implementations are set forth in the accompanying drawings and the description below.

Other features, objects and advantages will be apparent from the description and drawings, and from the claims.

Figure 1:
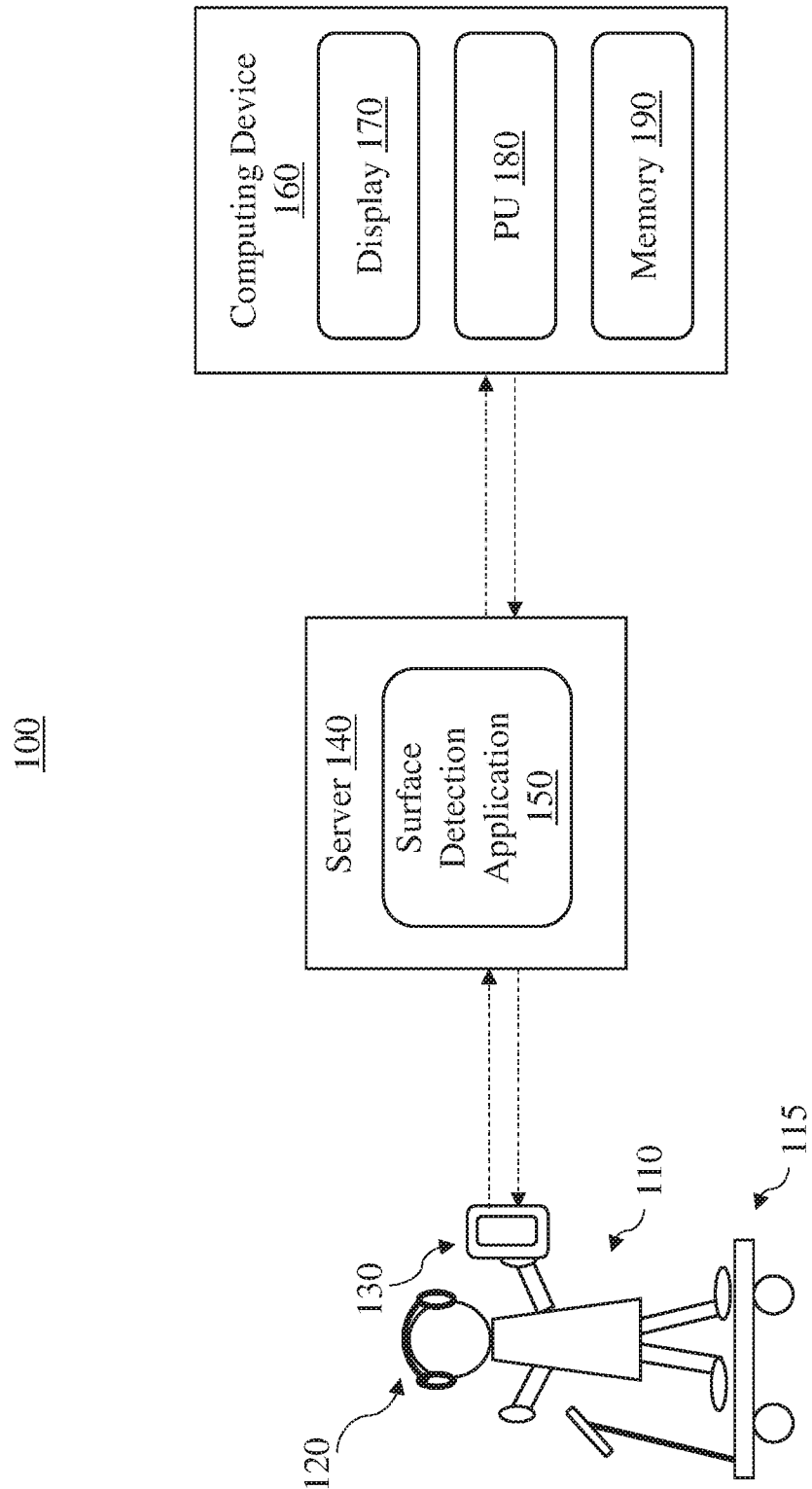
FIG. 1 is a data flow diagram illustrating interaction between devices in an environment according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a surface detection classifier for a micromobility (MM) vehicle can be trained to detect distinct surface types and/or surface characteristics. Certain implementations include approaches for training a surface detection classifier for MM vehicles. Other implementations include approaches for controlling operation of an MM vehicle based on detected travel over a surface type. Additional implementations include MM vehicles with a controller for taking one or more prescribed actions based on detected travel over a surface type.

As noted herein, the proliferation of MM vehicles has led to misuse by some operators. Various implementations address misuse in MM vehicles by effectively identifying operation on different surface types, and in some cases, taking corrective or other action. These approaches significantly reduce downsides associated with MM vehicle use, making such vehicles more attractive to municipalities and the general public.

Commonly labeled components in the FIGURES are considered to be substantially equivalent components for the purposes of illustration, and redundant discussion of those components is omitted for clarity.

Various implementations include approaches for training a surface detection classifier for a vehicle, such as a micromobility (MM) vehicle. FIG. 1 illustrates an example environment 100, including a user 110 on an MM vehicle 115. In various implementations, the MM vehicle 115 includes one of: a scooter, a tricycle, a bicycle, a unicycle, a skateboard, a multi-person transport vehicle or a personal transport vehicle. An example scooter is shown in FIG. 1. It is understood that the MM vehicle 115 can be a motorized (e.g., electric-powered and/or gas-powered) vehicle and/or a manually powered vehicle. In particular additional examples, the MM vehicle 115 includes a 4-wheeled single or two-person vehicle (e.g., "pod"), a tri-cycle (either enclosed as a pod, or open as a bicycle), a vehicle with five or more wheels, a two-wheeled vehicle with parallel (rather than in-line) wheels, vehicles with cargo capacity (for autonomous, remotely operated, or semi-autonomous vehicles), and tracked vehicles (e.g., those operating on a defined track or path). In various implementations, the MM vehicle 115 includes a body that at least partially contains: a platform for supporting a user (e.g., user 110), at least one wheel, and a motor coupled with the at least one wheel.

FIG. 1 shows the user 110 with a device 120. In particular examples, the device 120 is an audio device such as a wearable audio device. In various implementations, the device 120 is referred to herein as an audio device. While the audio device 120 is illustrated in this example as a wearable audio device (e.g., headphones, earphones, audio glasses, open-ear audio devices, shoulder-worn speakers or wearable speakers), the audio device 120 can include any conventional audio device such as a portable speaker, smart speaker, etc. Audio device 120 can also be integrated into or attached to MM vehicle 115. In some implementations, the audio device 120 is connected with a smart device 130. However, in other implementations, the audio device 120 can have integrated smart device capabilities (e.g., communications and data processing), such that a distinct smart device 130 is not necessary to perform functions described herein. In certain cases, the audio device 120 (e.g., wearable audio device) and the smart device 130 are collectively referred to as "a device", or "an electronic device." The MM vehicle 115, the audio device 120 and/or the smart device 130 include various sensors, data from which can be used according to various implementations to characterize surfaces and/or detect travel over restricted surfaces. In particular implementations, the MM vehicle 115, audio device 120 and/or smart device 130 includes a microelectromechanical systems (MEMS) device that combines a multi-axis accelerometer, gyroscope, and/or magnetometer (sometimes referred to as an IMU or inertial measurement unit). While orientation tracking and/or motion detection using an IMU is described according to various implementations, additional or alternative sensors can be used to provide feedback about user orientation and/or movement, e.g., optical tracking systems such as cameras or light detection and ranging (LIDAR) systems, and/or acoustic-based tracking systems.

As noted herein, in still other examples, the device 120 can be any wearable device with one or more sensors and processors configured to perform functions described with respect to the audio device. In these examples, the device 120 is a wearable smart device having one or more capabilities of the smart devices described herein.

In particular cases, the smart device 130 includes a smart phone, smart watch or other wearable smart device, portable computing device, etc., and has an audio gateway, processing components, and one or more wireless transceivers for communicating with other devices in the environment 100. For example, the wireless transceiver(s) in the smart device 130 can be used to communicate with the audio device (or another wearable device) 120, as well as one or more connected smart devices within communications range, e.g., the MM vehicle 115.

In various implementations, one or more of the MM vehicle 115, audio device 120 and smart device 130 includes a wireless transceiver for communicating with one another and/or additional devices and systems. For example, the wireless transceivers can also be used to communicate with a server 140 hosting a mobile application that is running on the smart device 130, for example, a surface detection application 150. The server 140 can include a cloud-based server, a local server or any combination of local and/or distributed computing components capable of executing functions described herein. In various particular implementations, the server 140 is a cloud-based server configured to host the surface detection application 150, e.g., running on the smart device 130. According to some implementations, the surface detection application 150 is downloaded to the MM vehicle 115, the audio device 120 and/or the user's smart device 130 in order to enable functions described herein. In certain cases, the server 140 is connected with a computing device 160 that enables coding of the surface detection application 150, e.g., by a software developer or other programmer.

In some example implementations, the computing device 160 is the same device as the smart device 130, and/or is an integral device within the smart device 130. In other example implementations, the computing device 160 is a device that is distinct from the smart device 130. In additional example implementations, the computing device 160 can include a cloud-based computing system that is accessible via a smart device (e.g., smart device 130) or other local computing device, e.g., via a web browser. In various implementations, the computing device 160 includes a display 170. In certain implementations, the display 170 includes a user interface such as a touch screen, graphical user interface or other visual interface. In cases where the computing device 160 is a smart device such as a smartphone or tablet, the display 170 includes the screen on that smart device. In other cases, the computing device 160 can include a PC, a smart television, a surface computing machine, etc., and the display 170 can be a separate physical device such as a monitor or projection screen. The computing device 160 can also include a processor (PU) 180 to execute instructions for detecting surface types and/or detecting travel over restricted surfaces. In some cases, a memory 190 is coupled with the processor (PU) 180 to store the instructions. In other implementations, the processor 180 can otherwise access the instructions, e.g., from a remote storage system connected with the computing device 160. When executed by the processor 180, the instructions cause the processor 180 to train, utilize and/or refine a surface detection classifier. In some cases, the instructions are part of the surface detection application 150, which can be accessed via the server 140 or locally stored in memory 190.

The memory 190 can include, for example, flash memory and/or non-volatile random access memory (NVRAM). In some implementations, instructions (e.g., software such as the surface detection application 150) are stored in an information carrier. The instructions, when executed by one or more processing devices (e.g., the processor 180), perform one or more processes, such as those described elsewhere herein. The instructions can also be stored by one or more storage devices, such as one or more (e.g. non-transitory) computer- or machine-readable mediums (for example, the memory, or memory on the processor). As described herein, the memory 190 can include instructions, or the processor 180 can otherwise access instructions for training, utilizing and/or refining a surface detection classifier according to various particular implementations. It is understood that portions of the memory (e.g., instructions) can also be stored in a remote location or in a distributed location, and can be fetched or otherwise obtained by the processor 180 (e.g., via any communications protocol described herein) for execution.

It is further understood that any components in the computing device 160, including components capable of storing and/or executing software instructions such as the surface detection application 150, can be included in the smart device 130 and/or the device 120 (e.g., wearable device and/or wearable audio device). Additionally, the components and associated functions described with reference to the wearable (e.g., audio) device 120, smart device 130 and/or computing device 160 can be combined into a single device such as any of those devices or another smart device described herein.

Figure 2:
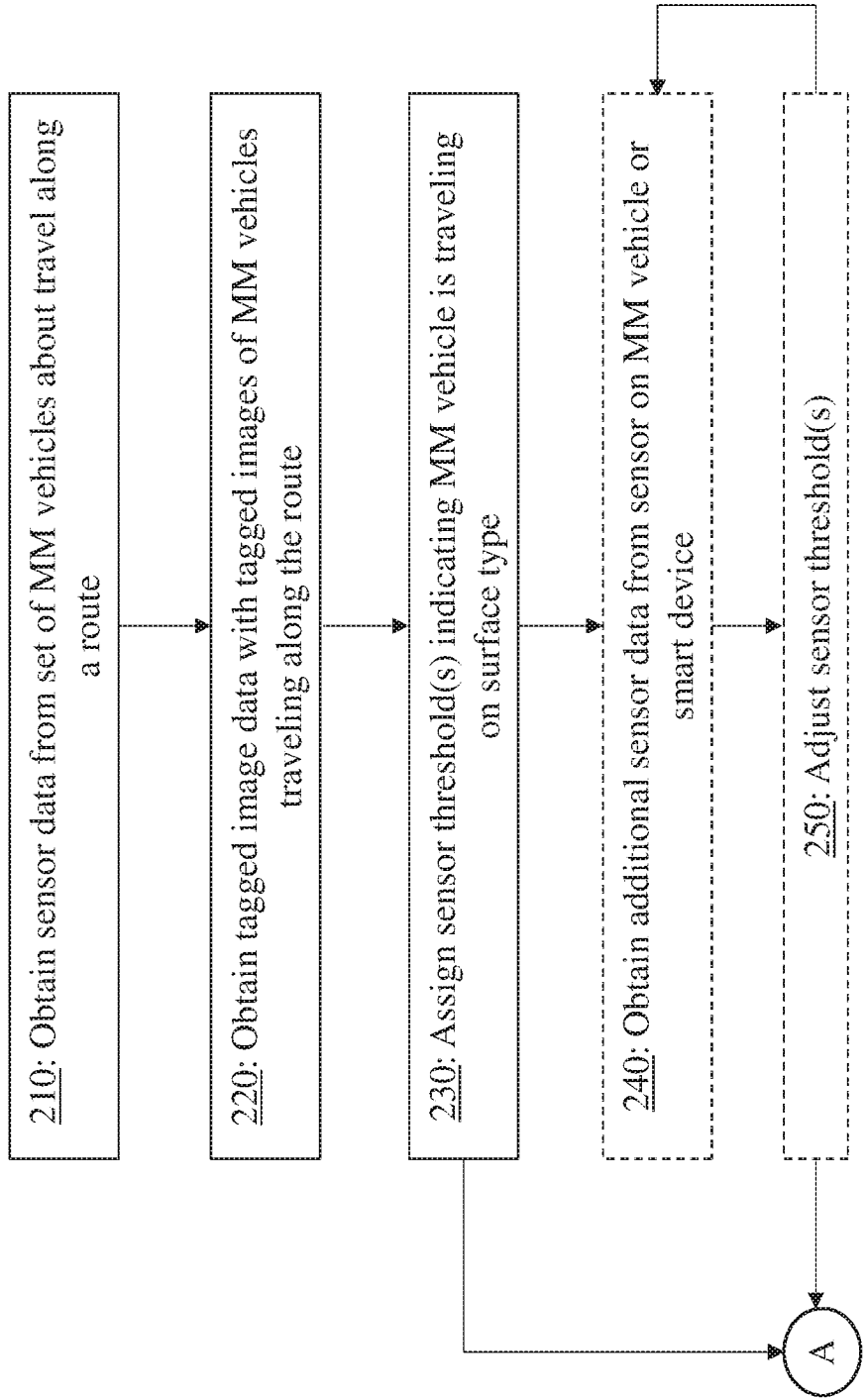
FIG. 2 is a flow diagram illustrating processes in a method of training a surface detection classifier according to various implementations.

FIG. 2 is a process flow diagram illustrating a computer-implemented method performed by the surface detection application 150 (FIG. 1), or other instructions executed by the processor 180, according to various implementations. These processes are described with continuing reference to FIG. 1, as well as reference to the example schematic depiction of users 110 traveling along routes in an environment in FIG. 3. In some cases, as described herein, processes shown sequentially can be performed simultaneously, or nearly simultaneously. However, in other cases, these processes can be performed in a different order.

Figure 3:
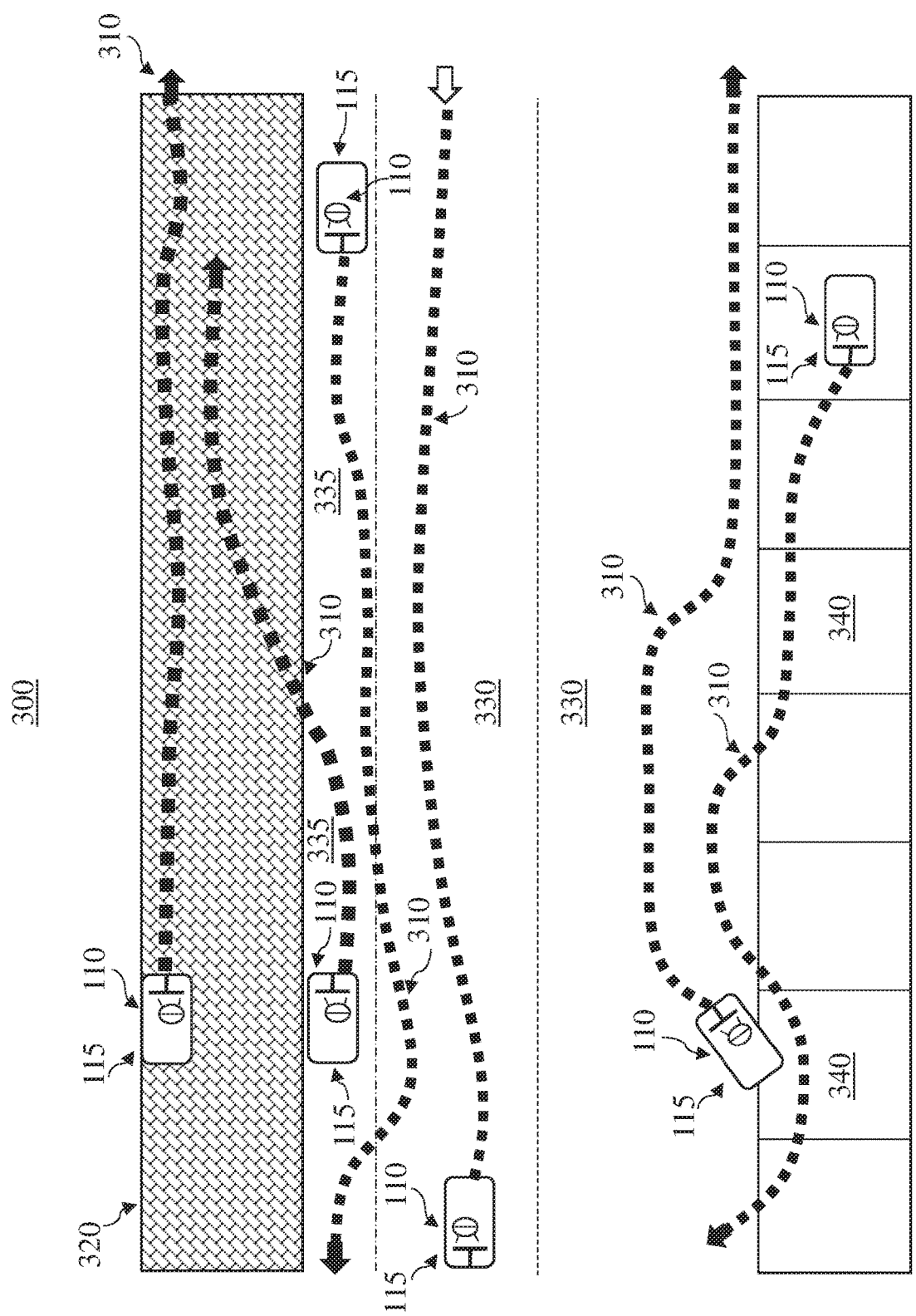
FIG. 3 is a schematic illustration of an environment including users traveling along routes with MM vehicles.

In a first process (FIG. 2), the surface detection application 150 obtains sensor data from a set of MM vehicles 115 traveling along a route (process 210). FIG. 3 illustrates a plurality of users 110 with MM vehicles 115 traveling along routes 310 in an environment 300, such as an outdoor environment. Although not specifically labeled, the users 110 may be wearing a device 120 and/or otherwise carrying a smart device 130. As noted herein, the sensor data can be obtained from any number of sensors located on the MM vehicle 115. In additional implementations, the sensor data can be obtained from the device 120 and/or smart device 130. In some cases, the sensor data is detected by a sensor that is configured to detect vibration of the MM vehicle 115. In various implementations, the sensor includes a MEMS sensor configured to detect vibration of the MM vehicle 115, and/or an IMU configured to detect vibration of the MM vehicle 115. In certain cases, the MEMS sensor and/or IMU is located on the MM vehicle 115. In other cases, the MEMS sensor and/or IMU is located on the user's smart device 130. In additional implementations, the sensor includes an optical sensor (e.g., a camera) at the MM vehicle 115 or the smart device 130 that is configured to detect vibration of the MM vehicle 115 and/or visual characteristics of the surface on which the MM vehicle 115 is traveling.

In a second process (process 220, FIG. 2), which can occur contemporaneously with, before, or after process 210, the surface detection application 150 obtains tagged image data including tagged images of the MM vehicles 115 traveling along the route 310 (FIG. 3). In various implementations, tagged image data includes images of the MM vehicles 115 traveling along a physical route (e.g., one or more of the routes 310), and can include images of the user 110 on (or otherwise transported by) the MM vehicle 115 and other visual indicators about the route 310. For example, the tagged image data can include tagged (or, identified) images of a user 110 riding an MM vehicle 115 over a particular type of surface, e.g., a sidewalk, walkway or another surface over which MM vehicle travel is restricted by a governing body. The tagged image data can also include embedded data such as the location where the image was captured, and the time at which the image was captured (timestamp).

Figure 4:
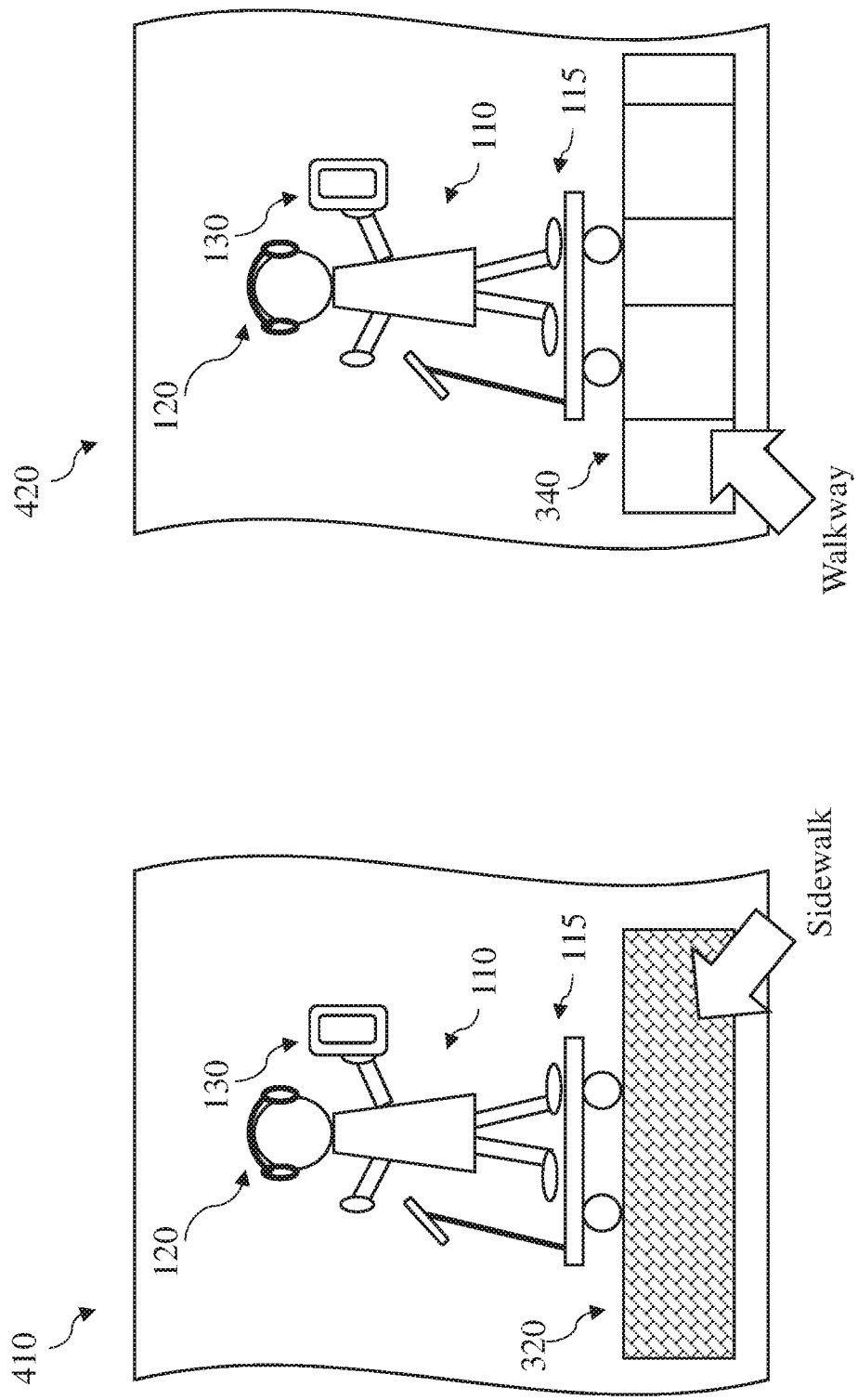
FIG. 4 shows examples of tagged images of users on MM vehicles.

FIG. 4 shows two tagged images, 410 and 420 where a user 110 is tagged, or identified, as traveling on an MM vehicle 115 over a sidewalk, and a walkway, respectively. In various implementations, the tagged image data is collected by one or more users and/or an image recognition engine that may or may not include a machine learning component. In some cases, the tagged image data can be obtained with crowd-sourced image recognition approaches that employ a number of users to sort through images to identify users 110 on MM vehicles 115, as well as users 110 on MM vehicles 115 traveling over particular surfaces. FIGS. 3 and 4 illustrate surfaces types including a sidewalk 320, roadway 330 (e.g., two lanes shown in FIG. 3), bicycle or other MM vehicle lane 335, and walkway 340. In some cases, the sidewalk 320 is a type of walkway 340, and as such, these can be referred to interchangeably. In other cases, a walkway 340 can include a moving walkway or platform for transporting users 110. The surface types can include different surface characteristics, e.g., bumpy sidewalks 320 made of brick as compared with smooth bicycle/MM vehicle lanes 335.

In various implementations, after obtaining the sensor data from the MM vehicles 115 and the tagged image data about the set of MM vehicles 115 traveling along routes 310, the surface detection application 150 is configured to assign a sensor threshold indicating that the MM vehicle 115 is traveling on a surface type (e.g., sidewalk 320, walkway 340, etc.) based on correlations between the sensor data about travel along the route 310 and the tagged images 410, 420 of the MM vehicles 115 (process 230, FIG. 2). In particular cases, the correlations are determined by aligning respective timestamps for the sensor data about travel along the route 310 with the tagged image data. That is, the surface detection application 150 is configured to align the timestamp of the sensor data (e.g., indicating vibration of the MM vehicle 115) with the timestamp of tagged image data.

In these cases, the surface detection application 150 is configured to assign sensor threshold(s) indicating that the MM vehicle is traveling on a surface type (e.g., sidewalk 320, walkway 340, etc.) based on the correlations between the sensor data and the tagged images. In particular cases, the sensor threshold includes a range of sensor values or a threshold pattern of sensor values that are indicative of travel on the surface type. For example, a sensor threshold can include a minimum level of detected vibration or a range of detected vibration (e.g., as correlated with travel over a sidewalk 320, where surfaces may be rough but inconsistent), or a vibration pattern (e.g., as correlated with travel over a walkway 340, where surfaces are consistent but intermittently rough or bumpy, such as between walkway segments). The surface detection application 150 can include a surface detection classifier that includes the correlations between sensor data about movement of the MM vehicle 115 and/or the smart device 130, and the travel surface types.

In additional implementations, the surface detection classifier includes correlations between: a) sensor data about movement of the MM vehicle 115 and/or smart device 130, b) position data indicating a location of the MM vehicle 115 and/or smart device 130 and/or c) known surface differentiating data (e.g., that the streets are asphalt, but the sidewalk on those streets is brick) for a location. In these cases, the surface detection classifier aids in detecting travel over a surface type in one or more particular locations, for example, in locations where differentiation between surface types is known. In these examples, the surface detection classifier differentiates between two or more known surface types, and in a location where those surface types are known, the surface detection classifier aids in determining whether the MM vehicle 115 is traveling over a given surface type. The surface detection classifier for identifying and/or differentiating between surface characteristics (or, patterns) can additionally be configured to detect: pavers/bricks/cobblestones (e.g., tightly packed bumps), gravel (e.g., consistent roughness), unpaved or grassy areas (e.g., varying roughness), localized surfaces such as speedbumps, known cracks in pavement or roadways, known potholes, etc.

As described herein, the surface detection classifier in the surface detection application 150 can include a neural network that is configured, after training, to adjust the sensor threshold based on additional correlations between: additional sensor data from a set of MM vehicles 115 about travel along an additional route 310($i$)-($n$), and tagged images of the MM vehicles 115 traveling along the additional route 310($i$)-($n$). That is, once trained, the surface detection classifier is configured to adjust sensor threshold(s) based on additional correlations between sensor data and tagged image data from routes 310($i$)-($n$) that are distinct from the routes on which it was trained. However, the surface detection classifier need not adjust sensor threshold(s) in all implementations, and may run within the surface detection application 150 using the sensor threshold(s) developed during training.

Figure 5:
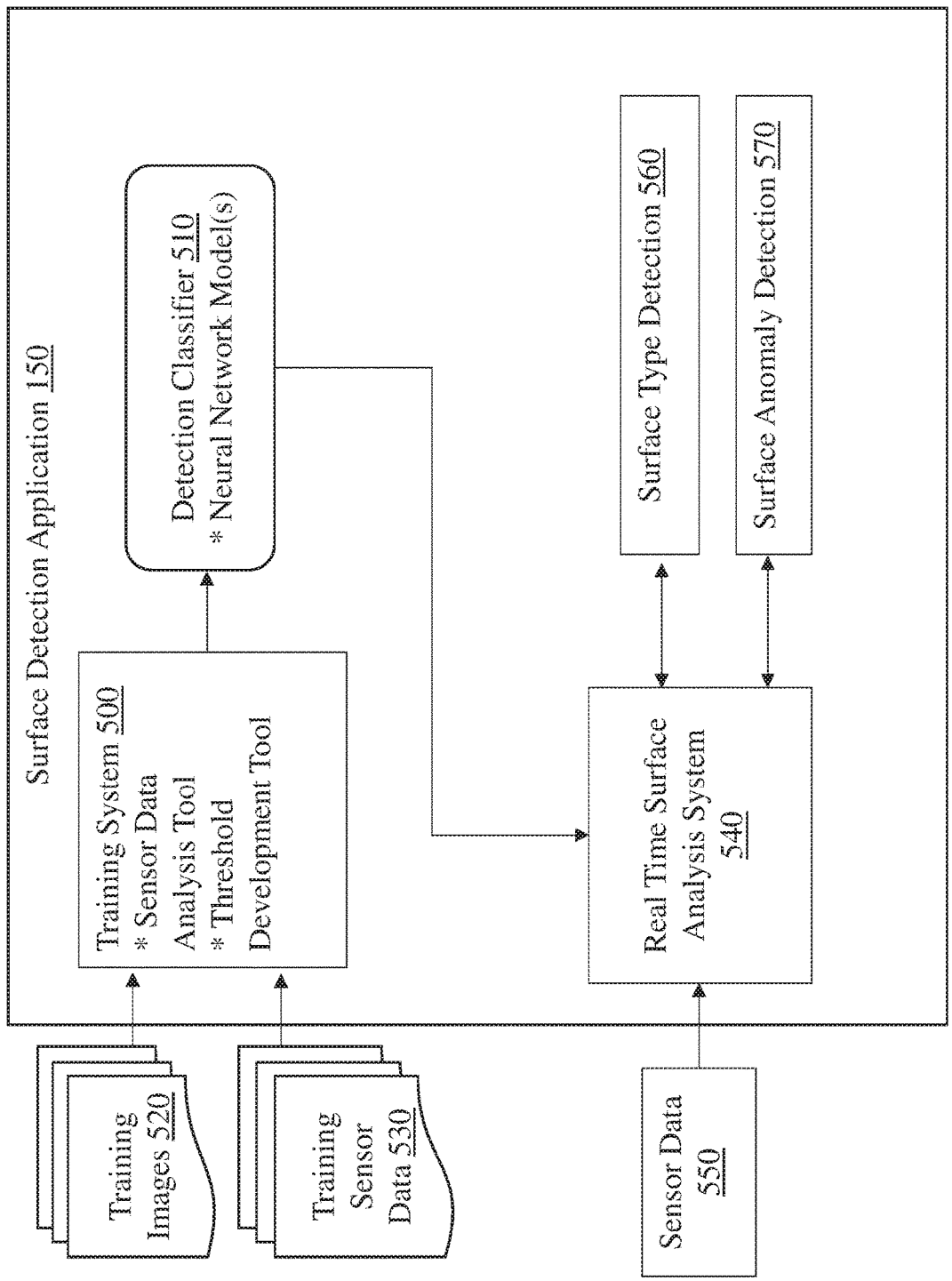
FIG. 5 is a data flow diagram illustrating processes in training and running a surface detection classifier and a real time surface analysis system according to various implementations.

FIG. 5 illustrates functions of the surface detection application 150, which may be executed as an artificial intelligence (AI) platform generally including: (1) a training system 500 that trains a detection classifier 510 based on a set of training images 520 (e.g., tagged images 410, 420, etc. in FIG. 4) and training sensor data 530; and (2) a real time surface analysis system 540 that utilizes the detection classifier 510 to analyze real time sensor data 550 to identify surface types (surface type detection 560), and identify surface anomalies (surface anomaly detection 570). The AI platform 10 may for example employ a neural network or other machine learning system. In various implementations, the AI platform is configured to run as a cloud platform (e.g., a cloud-based machine learning system) and/or a device-based platform (e.g., on one or more devices shown herein, such as device 120, smart device 130 and/or computing device 160).

In this example implementation, detection classifier 510 is trained with a deep learning system to detect both surface types and surface anomalies. Alternatively, two detection classifiers 510 could be trained; one that detects surface types and one that detects surface anomalies. As noted herein, training images 520 may, for example, be obtained from frames in captured videos or in other still images. In some cases, the training images 520 are tagged images (e.g., such as tagged images 410 and 420 in FIG. 4), or in other cases, the set of training images 520 can be tagged with labels to reference surface types and/or surface anomalies. Any labeling system may be employed, such as LabelImg which is available as an open source on GitHub. Training sensor data 530, as described herein, can include sensor data obtained from one or more sensors at the MM vehicle 115, audio device 120 and/or smart device 130.

Once all of the training images 520 are obtained (either pre-tagged or subsequently tagged) and the training sensor data 530 is obtained, training system 500 can be employed to train the detection classifier 510. Detection classifier 510 may for example comprise a neural network model into which the pixel data from each training image is processed. In one non-limiting example, an application programming interface (API) by TensorFlow™ can be used to construct the neural network model representative of a graph that includes nodes and edges. In this case, the model is mapped to underlying machine hardware. Nodes in the graph represent operations (e.g., machine learning functions, mathematical operations, etc.), and the edges represent the multidimensional data arrays also known as tensors communicated between the nodes. The unique edges, called control dependencies, can exist in the graph and denote that the source node must finish executing before the destination node starts executing. TensorFlow provides a platform in which the designer's design algorithm flow and computation architecture is automatically optimized. Nodes are assigned to computational devices and execute asynchronously, and in parallel once all the tensors on their incoming edges become available.

In particular implementations, as shown in FIG. 5, the surface detection classifier 510 can include at least two distinct models. For example, these models can include: a) a model of a human user damping system and reaction of the human user damping system to vibration, and b) a model of the MM vehicle damping system and reaction of the MM vehicle damping system to vibration. In these cases, the surface detection classifier 510 can differentiate between reaction of the human user damping system and reaction of the MM vehicle damping system to vibration. In certain cases, the first model (a) can account for multiple human users (e.g., riders) and/or cargo (e.g., static cargo and/or live cargo such as pets, cattle, etc.). In additional cases, the second model (b) accounts for vehicles without (e.g., human) users, such as driverless vehicles carrying cargo. In various implementations, the models (a), (b) can include individual system components that have an impact on vibration signature and damping, including but not limited to: i) human biological system components such as knees, hips, ankles, etc., and ii) MM vehicle system components such as tire characteristics, shock/suspension characteristics, frame characteristics, bushings, etc. These models, as well as their permutations, can include electro-mechanical analog system models, frequency dependent models, etc.

Returning to FIG. 2, in optional implementations depicted in phantom, the surface detection application 150 can also obtain additional sensor data from a sensor at each MM vehicle 115 or a sensor on a user's smart device 130 (process 240). In these cases, the additional sensor data includes at least one of: camera data, inertial measurement unit (IMU) data, voice activity data, acoustic signal data, environmental condition data, MM vehicle condition data, vehicle to everything (V2X) data from another vehicle, or location data about the MM vehicle 115 or the smart device 130. After obtaining the additional sensor data, in another optional process, the surface detection application 150 is configured to adjust the sensor threshold indicating that the MM vehicle 115 is traveling on the surface type based on the additional sensor data (process 250). Processes 240 and 250 can be repeated, e.g., on a rolling basis as additional sensor data is obtained, or on a periodic basis.

In additional implementations, the surface detection application 150 is configured to update map data about one or more geographic locations, along with the surface detection classifier 510 (FIG. 5), based on the tagged image data and sensor data obtained in processes 210 and 220. Using FIG. 3 as an example, as described herein, the surface detection application 150 is configured to: i) identify surface types along routes 310 based on the tagged image data and the sensor data from the MM vehicle 115 and/or devices 120, 130; ii) identify surface anomalies along the route(s) 310 based on the sensor data; iii) update map data to reflect the identified surface type(s) at locations on the map, as well as surface anomalies along the route; and iv) update the surface detection classifier 510 (FIG. 5) to assign distinct sensor thresholds for indicating that the MM vehicle 115 is traveling on the surface type to distinct geographic locations based on the updated map data. In these implementations, the surface detection application 150 is configured to attribute surface characteristics to particular locations using the training data (e.g., tagged image data and sensor data) and/or data obtained during usage of the surface detection application 150 after training. These processes can include assigning surface types to portions of map data at a set of locations, for example, assigning the surface type sidewalk 320 (FIG. 3) to map data for that geographic location. Additionally, the surface detection application 150 identifies surface anomalies using the sensor data obtained from one or more MM vehicles 115 (and/or devices 120, 130) traveling along the route(s) 310. Surface anomalies can be detected using the surface detection classifier 510, and can include variations in the type of surface along a route 310 (e.g., brick v. concrete sidewalks), cracks in sidewalks, potholes, unfinished surfaces, etc.

In certain cases, surface anomalies can include variations on types of surfaces that may be particular to geographic locations. For example, in a particular geographic location (e.g., Boston, Mass.), many sidewalks are formed using brick or cobblestone. However, in other geographic locations (e.g., Atlanta, Ga.), the vast majority of sidewalks are formed of concrete or the like. Once trained, the surface detection application 150 is configured to detect both forms of sidewalk, however, the sensor data obtained from travel over these distinct types of sidewalks will vary significantly. In this particular example, the surface detection application 150 is configured to update the map data to reflect surface type(s) at one or more geographic locations, as well as surface anomalies along one or more route(s) 310. Additionally, the surface detection application 150 is configured to update the surface detection classifier 510 (FIG. 5) to assign distinct sensor thresholds for indicating that the MM vehicle 115 is traveling on a surface type to distinct geographic locations based on the updated map data. In these cases, the surface detection application 150 receives geographic-specific sensor thresholds for indicating that the MM vehicle 115 is traveling on a surface type. In various implementations, the surface detection application 150 uses geographic location data such as GPS data, local area network (LAN) data such as WiFi, Bluetooth triangulation and/or cellular data triangulation, e.g., from the smart device 130 to detect the geographic location of the MM vehicle 115 and update the surface detection classifier for that geographic location.

Figure 6:
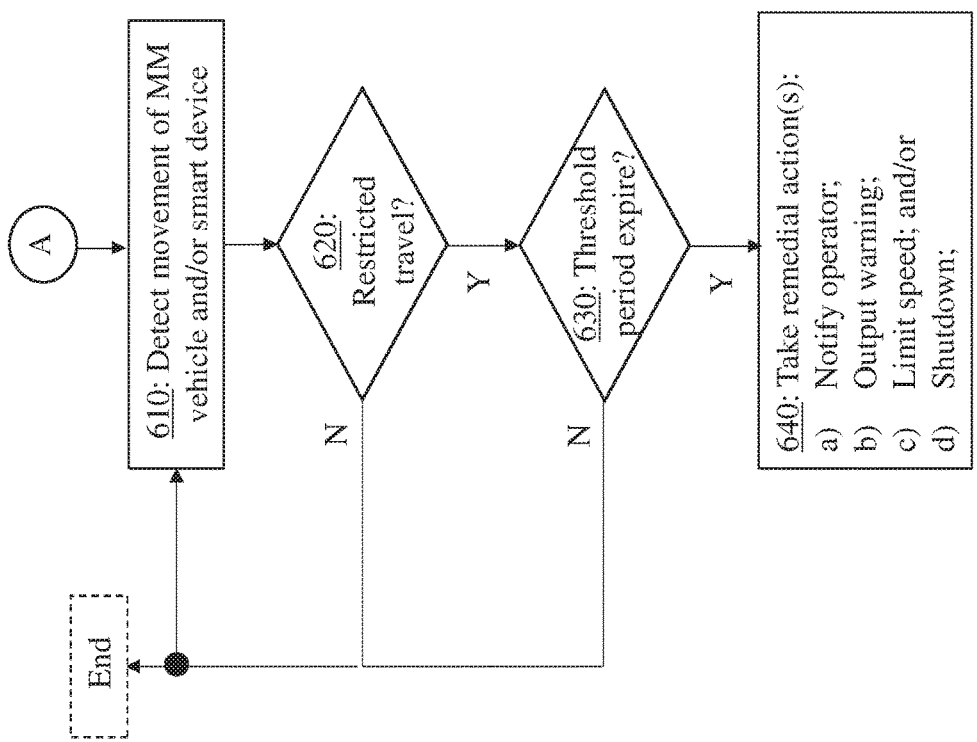
FIG. 6 is a flow diagram illustrating additional processes in a method performed by a surface detection application.

As noted herein, the surface detection application 150 (including surface detection classifier 510) can be trained using sensor data and tagged images of MM vehicles 115 traveling along one or more route(s) 310 (FIG. 3). FIG. 6 is a flow diagram illustrating processes in deploying the surface detection application 150 after the surface detection classifier 510 is trained. In some cases, the processes depicted in FIG. 6 can follow processes depicted in the flow diagram of FIG. 2, e.g., following node A. As shown in FIG. 6, the surface detection application 150 is configured to detect movement of the MM vehicle 115 and/or smart device 130 located with a user 110 while operating the MM vehicle 115 (FIG. 1) (process 610). As noted herein, movement of the MM vehicle 115 and/or smart device 130 can be detected by one or more sensors on board those devices, and in some cases, movement is detected using a MEMS sensor and/or an IMU. The surface detection application 150 compares the detected movement with a surface detection classifier (e.g., surface detection classifier 510, FIG. 5), which can include one or more threshold(s) that correlate movement with surface type, e.g., restricted surface types (decision 620).

If the comparison does not indicate that the MM vehicle 115 is traveling on a restricted surface type (No to decision 620), the surface detection application 150 can revert to process 610, e.g., to continually monitor the movement of the MM vehicle 115 while the surface detection application 150 is active. In additional implementations, after one or more No responses to decision 620, the process ends. In these cases, the surface detection application 150 may only run periodically, or in response to a trigger from another application, such as a location application on the smart device 130 indicating that the MM vehicle is located in a geographic location with one or more restricted surface types.

If the comparison indicates that the MM vehicle 115 is traveling on a restricted surface type (Yes to decision 620), the surface detection application 150 monitors the movement of the MM vehicle 115 over a period (decision 630) before taking action. If the MM vehicle 115 leaves the restricted surface type (as indicated by sensor data) before expiration of a threshold period, the surface detection application 150 reverts back to process 610, or ends (No to decision 630).

In certain implementations, the threshold period is equal to a number of seconds, e.g., 5, 10, 20, 30 or 40 seconds. In other cases, the threshold period is equal to one, two, three, four or more minutes. In particular cases, the threshold period is equal to less than two minutes. As noted herein, the threshold period can be tied to an initial remedial action, and additional threshold periods can be tied to further, potentially more severe remedial actions. In various implementations, the threshold period is based on a confidence level of detecting that the MM vehicle 115 is traveling on a restricted surface type. For example, the confidence level can vary based on the certainty of the identification by the surface detection application 150 (as noted herein). In these cases, the confidence level is reduced where sensor data is insufficient or unclear, or for lack of convergence of the surface detection classifier (e.g., classifier does not indicate that this surface type has been detected previously). In cases where the confidence level is low (e.g., below a threshold level), the threshold period is longer (or, extended) that those cases where the confidence level is high (e.g., above the threshold level), in order to gather more data or allow the surface detection application 150 to restart the detection classifier.

If the MM vehicle 115 is still determined to be traveling on the restricted surface type after the threshold period expires (Yes to decision 630), the surface detection application 150 is configured to take one or more remedial actions (process 640). In various implementations, the remedial action can include one or more of: a) notifying an operator of the MM vehicle 115 about the travel on the restricted surface type, b) outputting a warning at an interface connected with the MM vehicle 115 or the smart device 130, c) limiting a speed of the MM vehicle 115, or d) disabling operation of the MM vehicle 115. In certain implementations, the remedial actions are performed in an escalating manner, such that the remedial actions are increased from (a) to (d) after expiration of additional threshold periods. For example, the surface detection application 150 can be configured, after expiration of a first threshold period of approximately 15-30 seconds, to notify the operator of the MM vehicle 115 about travel on a restricted surface type (e.g., with an audible notification at an audio device 120 and/or the smart device 130, or vibrational feedback at the MM vehicle 115 and/or the smart device 130). An example audible notification can include: "You are traveling on a sidewalk, please find a roadway." After expiration of a second threshold period following the first threshold period (e.g., another 15-30 seconds), where the MM vehicle 115 is still detected as traveling on the restricted surface, the surface detection application 150 can be configured to output a warning, e.g., at a visual and/or audio interface on the MM vehicle 115, audio device 120 and/or smart device 130 (for example, "Warning, continued travel on restricted surface will result in shutdown). After expiration of a third threshold period following the second threshold period (e.g., another 15-30 seconds), where the MM vehicle 115 is still detected as traveling on the restricted surface, the surface detection application 150 can be configured to limit the speed of the MM vehicle 115, for example, to half speed or less, and may also output a message (e.g., "Please find permissible travel route or device will shut down"). After expiration of a fourth threshold period following the second threshold period (e.g., another 15-30 seconds), where the MM vehicle 115 is still detected as traveling on the restricted surface, the surface detection application 150 can be configured to disable operation of the MM vehicle 115, and may also output a message (e.g., "Shutdown due to restricted travel path").

In particular implementations, the remedial action is tied to the confidence level of the surface classification as identified by the surface detection application 150. In these cases, the remedial action is related to one or more of the following: classification certainty (e.g., surface detection application 150 is very certain that MM vehicle 115 is traveling on a restricted surface), duration of the threshold period (e.g., surface detection application 150 is very certain that MM vehicle 115 has been traveling on a restricted surface for an extended period, such as several minutes), frequency of the detected travel on the restricted surface type (e.g., surface detection application 150 indicates that the MM vehicle 115 has traveled on a restricted surface several times in the last 5, 10, or 15 minutes, and is highly certain of those incidents).

In certain implementations, the surface detection application 150 is also configured to log sensor data and location data about the MM vehicle 115 or the smart device 130 in response to detecting that the MM vehicle is traveling on the restricted surface type (Yes to decision 620). As noted herein, in some implementations, this logged sensor data can be used to update the detection classifier 510 (FIG. 5). This process can be similarly performed in response to detecting that he MM vehicle is not traveling on a restricted surface type (No to decision 620, where logged data is used to update the detection classifier 510.

In still further implementations, the surface detection application 150 is configured to prompt the user 110 for feedback about the surface type over which the MM vehicle 115 is travelling, either during travel (e.g., via an audio prompt at the audio device 120 and/or smart device 130) or afterward (e.g., via audio or visual prompt at an interface such as an interface on the audio device 120 and/or smart device 130). Based on this feedback received from the user 110, the surface detection application 150 can update the detection classifier 510 (FIG. 5), e.g., by adjusting thresholds for surface detection.

In additional implementations, the surface detection application 150 is configured to generate navigational directions or otherwise provide guidance to users about travel along a particular route based on the logged sensor data from users 110 traveling on MM vehicles 115. For example, in some cases, the surface detection application 150 is configured to create navigation instructions for output to users 110 (e.g., at the audio device 120 or via another interface described herein) to direct the users 110 away from travel on restricted surfaces and/or to direct users 110 toward travel on preferable surfaces. In these cases, the surface detection application 150 is configured to insert navigation instructions as markers or pins in a map or other rendering of an environment 300 to provide instructions to one or more users 110 that intersect that marker or pin in the environment 300. In some cases, the navigation instructions are inserted as audio pins (e.g., "turn left at this intersection to avoid rough pathways") and/or haptic indicators (e.g., vibrational indicators rendered on the user's right side). In certain cases, the marker(s) or pin(s) augment map or other navigational data, e.g., as an add-on to map data about an environment 300. In various implementations, the surface detection application 150 is configured to provide navigation instructions to the user 110 based on a travel route of the MM vehicle 115, the surface detection classifier 510 (FIG. 5) for the MM vehicle 115, and a known surface type along the travel route (e.g., route 310, FIG. 3).

In further implementations, the surface detection application 150 is configured to affirm (or, reassure) the user 110 that he/she is following a desired or otherwise unrestricted travel route. For example, the surface detection application 150 is configured to output an affirmation indicator to the user 110 as that user 110 travels along one or more particular surface types (e.g., surfaces that are not restricted surface types or otherwise unsafe surfaces). In certain cases, the affirmation indicator is an audio cue such as a tone or low-level (e.g., background) signal. In other cases, the affirmation indicator is a haptic cue such as a vibrational indicator or pressure indicator (such as a tightening and releasing of a wearable device). The affirmation indicator is controlled by the surface detection application 150, and can be periodically output as the user 110 travels along a route (e.g., routes 310, FIG. 3) to indicate compliance with prescribed surface-type travel. In certain examples, the surface detection application 150 outputs an affirmation indicator every X seconds or every Y meters traveled to reassure the user 110 that he/she is not traveling on a restricted surface type. In particular examples, the surface detection application 150 outputs the affirmation indicator according to a prescribed cadence when the user 110 is following a route without restricted surfaces, and adjusts the cadence of the affirmation indicator output as the user approaches a location along the route that requires user action (e.g., a change in direction, dismounting of the MM vehicle 115, etc.). In these cases, the surface detection application 150 outputs a distinct indicator (e.g., action indicator) as the user 110 reaches the location along the route that requires user action (e.g., a distinct audio output such as a different tone type, louder tone, etc., or a distinct haptic indicator such as a different frequency or pattern of vibration), e.g., to indicate to the user 110 that action should be taken. The MM vehicle 115, audio device 120 and/or smart device 130 can be configured to output the affirmation indicator and/or action indicator, for example, via actuators in the handle bars of the MM vehicle 115, earcups or straps/bands in the audio device 130 and/or in the casing of the smart device 130, and/or via any transducer(s) at one or more such devices. In certain cases, the surface detection application 150 outputs the affirmation indicator and/or action indicator directionally. That is, the indicator(s) can be output to the left, right, front, back, etc. of the user 110 in order to indicate a preferred direction of travel. For example, the handlebars of the MM vehicle 115 can vibrate on the right or left-hand side to indicate that the user 110 should turn the MM vehicle 115 in one of those directions. In additional example, the surface detection application 150 initiates spatialized audio output at the audio device 120 such that the user 110 perceives a tone or other audio output as originating from a direction in which the user should turn the MM vehicle 115. In particular implementations, the navigation instructions prompt the user 110 to limit travel of the MM vehicle 115 over a restricted surface type.

In further implementations, the surface detection application 150 is configured to perform additional processes based on data gathered from one or more additional sensors. For example, the surface detection application 150 can be configured to provide navigational instructions (as described herein) based on inputs from one or more additional sensors, such as environmental and/or air quality sensors. In certain implementations, the surface detection application 150 is configured to receive sensor input data about one or more ambient conditions in an environment 300 (FIG. 3) and provide navigation instructions or otherwise modify navigation instructions based on the sensor input data. In some cases, the ambient conditions include air quality or other environmental data such as temperature, humidity, the presence of a threshold amount of dust or other particulate, etc. In certain implementations, in response to receiving data indicating that the ambient conditions in an environment 300 meet or exceed a threshold (e.g., air quality below a threshold, particular content above a threshold, humidity above a threshold), the surface detection application 150 provides navigation instructions (e.g., via any interface described herein) to direct one or more users 110 away from the environment 300. In various implementations, the data about the ambient conditions in the environment 300 is gathered by sensors from a plurality of users 110 and associated devices (e.g., audio devices 120 and/or smart devices 130) and/or vehicles (e.g., MM vehicles 115), and is updated on a periodic or rolling basis. In these cases, such as where the surface detection application 150 is executed as a cloud-based platform, the surface detection application 150 can obtain relevant ambient condition data about an environment 300 from a set of users 110 and provide navigation instructions to those users 110 based on the ambient condition data, e.g., instructions to leave the environment 300 where air quality is low. In addition, the surface detection application 150 can provide navigation instructions to other users 110 that are proximate to (but not necessarily located at) the environment 300 to avoid that environment 300 where the sensor data indicates that the ambient conditions are undesirable (e.g., air quality is low, particulate level is high). That is, in certain aspects, the surface detection application 150 provides navigation instructions to the user 110 based on a detected ambient environmental condition in an environment proximate a travel route of the MM vehicle 115, where the ambient environmental condition is detected by sensors on a plurality of distinct MM vehicles 115 in the environment that are distinct from the MM vehicle 115.

The various implementations disclosed herein enable effective and reliable detection of misuse of MM vehicles. The vehicles and approaches described herein can ease use of MM vehicles on compliant pathways and roadways, thereby increasing the appeal of these MM vehicles to municipalities and other organizations, as well as to the general public. In any case, the surface detection application 150 has the technical effect of detecting a surface over which an MM vehicle is traveling, and in certain cases, initiating remedial action for misuse of the MM vehicle.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A computer-implemented method comprising:
comparing: i) detected movement of a device located with a user at a micromobility (MM) vehicle while operating the MM vehicle, with ii) a surface detection classifier for the MM vehicle,
wherein the device includes a wearable audio device and wherein the movement is detected by a sensor on the wearable audio device,
wherein the surface detection classifier includes at least two distinct models including a) a model of a human user damping system and reaction of the human user damping system to vibration, and b) a model of the MM vehicle damping system and reaction of the MM vehicle damping system to vibration, wherein model (a) includes individual system components including human biological system components,
wherein the surface detection classifier includes correlations between sensor data about movement of the wearable audio device, and travel surface types; and
in response to detecting that the MM vehicle is traveling on a restricted surface type for a threshold period, performing at least one remedial action including: a) notifying an operator of the MM vehicle about the travel on the restricted surface type, b) outputting a warning at an interface connected with the MM vehicle or the device, c) limiting a speed of the MM vehicle, or d) disabling operation of the MM vehicle.

2. The computer-implemented method of claim 1, further comprising,
logging sensor data and location data about the MM vehicle or the device in response to detecting that the MM vehicle is traveling on the restricted surface type, and
updating the detection classifier in response to detecting that the MM vehicle is traveling on the restricted surface type or in response to detecting that the MM vehicle is traveling on a permitted surface type.

3. The computer-implemented method of claim 1, wherein the threshold period is based on a confidence level of detecting that the MM vehicle is traveling on the restricted surface type.

4. The computer-implemented method of claim 1, further comprising:
prompting the user for feedback about the surface type over which the MM vehicle is travelling; and
updating the surface detection classifier based upon received feedback from the user.

5. The computer-implemented method of claim 1, further comprising,
providing navigation instructions to the user based on a travel route of the MM vehicle, the surface detection classifier for the MM vehicle, and a known surface type along the travel route,
wherein the navigation instructions prompt the user to limit travel of the MM vehicle over the restricted surface type, wherein the navigation instructions are provided as an indicator including at least one of an affirmation indicator or an action indicator, and wherein the indicator includes audio instructions on the device or a tactile indicator at the device or the MM vehicle.

6. The computer-implemented method of claim 1, further comprising providing navigation instructions to the user based on a detected ambient environmental condition in an environment proximate a travel route of the MM vehicle, wherein the ambient environmental condition is detected by sensors on a plurality of distinct MM vehicles in the environment that are distinct from the MM vehicle.

7. The computer-implemented method of claim 1, wherein the computer-implemented method is executed on the wearable audio device, wherein the sensor on the wearable audio device includes at least one of: a micro-electromechanical system (MEMS) sensor configured to detect vibration of the MM vehicle, or an inertial measurement unit (IMU) configured to detect vibration of the device, and wherein the human biological system components include at least one of human knees, human hips, or human ankles.

8. The computer-implemented method of claim 1, further comprising updating the surface detection classifier based on detected geographic location data, wherein the updated surface detection classifier includes a geographic-specific sensor threshold for indicating that the MM vehicle is traveling on the restricted surface type.

9. The computer-implemented method of claim 1, wherein comparing the detected movement of the device with the surface detection classifier is performed as part of a first software application running on the wearable audio device is only performed in response to a trigger from a second software application that indicates the wearable audio device or the MM vehicle is located in a geographic location with one or more restricted surface types.

10. The computer-implemented method of claim 1, wherein the remedial action is selected based on at least one of, a level of certainty that the MM vehicle is traveling on the restricted surface type, a duration of the threshold period, or a frequency of the detected travel on the restricted surface type.

11. The computer-implemented method of claim 1, wherein comparing the detected movement of the device with the surface detection classifier for the MM vehicle is performed without knowledge of a geographic location of the MM vehicle or the user.

12. The computer-implemented method of claim 1, further comprising periodically outputting, via the wearable audio device, an affirmation indicator that indicates the user is following a travel route unrestricted by the restricted surface type.

13. The computer-implemented method of claim 12, wherein the affirmation indicator includes an audio cue output at a transducer on the wearable audio device, and wherein periodically outputting the affirmation indicator includes adjusting a cadence of the affirmation indicator as the user approaches a location along the travel route that requires user action.

14. A micromobility (MM) vehicle comprising:
a body at least partially containing: a platform for supporting a user, at least one wheel, and a motor coupled with the at least one wheel; and
a controller in communication with a sensor on a device and configured to regulate the motor, wherein the controller is programmed to:
compare: i) detected movement of the device located with the user at the MM vehicle while operating the MM vehicle, with ii) a surface detection classifier for the MM vehicle,
wherein the device includes a wearable audio device and wherein the movement is detected by the sensor,
wherein the surface detection classifier includes at least two distinct models including a) a model of a human user damping system and reaction of the human user damping system to vibration, and b) a model of the MM vehicle damping system and reaction of the MM vehicle damping system to vibration, wherein model (a) includes individual system components including human biological system components,
wherein the surface detection classifier includes correlations between sensor data about movement of the wearable audio device, and travel surface types, and
wherein comparing the detected movement of the device with the surface detection classifier for the MM vehicle is performed without knowledge of a geographic location of the MM vehicle or the user; and
in response to detecting that the MM vehicle is traveling on a restricted surface type for a threshold period, performing at least one of: a) notify the user of the MM vehicle about the travel on the restricted surface type, b) output a warning at an interface connected with the MM vehicle or the device, c) limit a speed of the MM vehicle, or d) disable operation of the MM vehicle.

15. The MM vehicle of claim 14, wherein the sensor comprises an inertial measurement unit (IMU) configured to detect vibration of the device.

16. The MM vehicle of claim 14, wherein the controller is further configured to update the detection classifier based upon detecting that the MM vehicle is traveling on a restricted surface type or based upon detecting that the MM vehicle is traveling on a permitted surface type, wherein the surface detection classifier includes correlations between sensor data about movement of the MM vehicle or the device, and travel surface types, and wherein the threshold period is based on a confidence level of detecting that the MM vehicle is traveling on a restricted surface type.

17. The MM vehicle of claim 14, wherein the controller is further configured to:

prompt the user for feedback about the surface type over which the MM vehicle is travelling; and update the surface detection classifier based upon received feedback from the user.

18. The MM vehicle of claim 14, wherein the controller is further configured to provide navigation instructions to the user based on a travel route of the MM vehicle, the surface detection classifier for the MM vehicle, and a known surface type along the travel route, wherein the navigation instructions prompt the user to limit travel of the MM vehicle over the restricted surface type, wherein the navigation instructions are provided as an indicator including at least one of an affirmation indicator or an action indicator, and wherein the indicator includes audio instructions on the device or a tactile indicator at the device or the MM vehicle.

19. A method of training a surface detection classifier for a micromobility (MM) vehicle, the method comprising:

obtaining sensor data from a set of wearable audio devices worn by users of MM vehicles about travel along a route;

obtaining tagged image data comprising tagged images of the set of MM vehicles traveling along the route; and assigning a sensor threshold indicating that the MM vehicle is traveling on a surface type based on correlations between the sensor data from the wearable audio devices about travel along the route and the tagged images of the MM vehicles, wherein the surface detection classifier includes at least two distinct models including a) a model of a human user damping system and reaction of the human user damping system to vibration, and b) a model of the MM vehicle damping system and reaction of the MM vehicle damping system to vibration, wherein model (a) includes individual system components including human biological system components, and wherein the surface detection classifier is independent of a known geographic location of the MM vehicle or the user.

20. The method of claim 19, wherein the surface type comprises a sidewalk surface or another surface over which MM vehicle travel is restricted by a governing body, wherein the correlations are determined by aligning respective timestamps for the sensor data about travel along the route with the tagged image data, wherein the sensor threshold comprises a range of sensor values or a threshold pattern of sensor values indicative of travel on the surface type, and wherein the set of MM vehicles comprises a plurality of MM vehicles comprising at least one of: a scooter, a tricycle, a bicycle, a unicycle, a skateboard, a multi-person transport vehicle or a personal transport vehicle.

* * * * *